(No Model.)

H. T. SIDWAY.
BISCUIT CUTTER.

No. 414,452. Patented Nov. 5, 1889.

WITNESSES:

INVENTOR:
H. T. Sidway
BY
Munn & Co.
ATTORNEYS.

UNITED STATES PATENT OFFICE.

HENRY T. SIDWAY, OF CHICAGO, ILLINOIS.

BISCUIT-CUTTER.

SPECIFICATION forming part of Letters Patent No. 414,452, dated November 5, 1889.

Application filed November 27, 1888. Serial No. 291,952. (No model.)

*To all whom it may concern:*

Be it known that I, HENRY T. SIDWAY, of Chicago, in the county of Cook and State of Illinois, have invented a new and Improved Biscuit-Cutter, of which the following is a specification, reference being had to the annexed drawings, forming a part thereof, in which—

Figure 1:
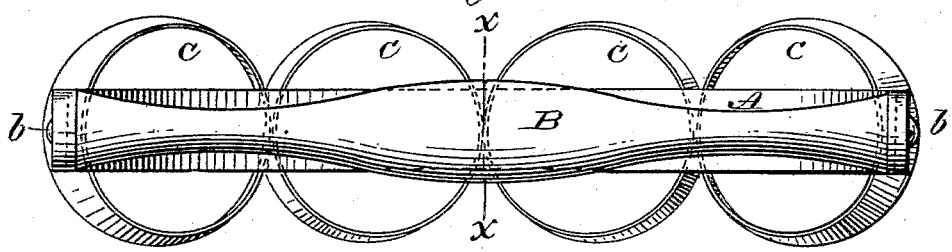
Figure 2:
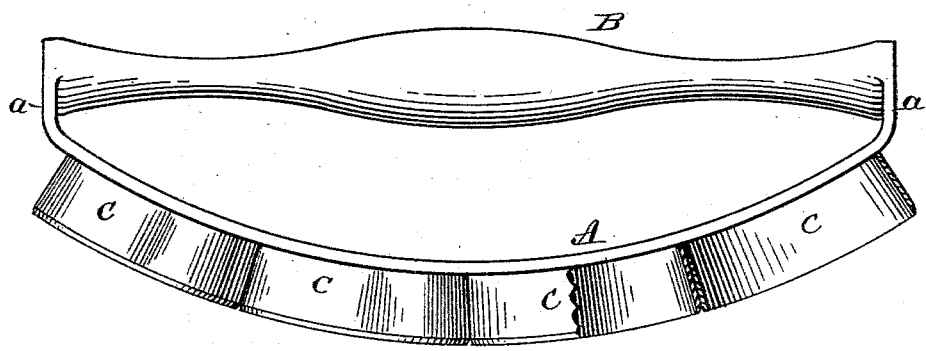
Figure 3:
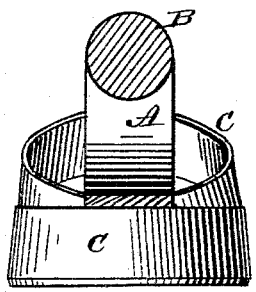

Figure 1 is a plan view of my improved biscuit-cutter. Fig. 2 is a side elevation of a modification, partly in section; and Fig. 3 is a transverse section taken on line $xx$ in Fig. 1.

My invention relates particularly to that class of biscuit-cutters in which a number of biscuits are cut at a single operation; and it consists in the combination, with a curved bar provided with a suitable handle, of a series of cutters attached to the bar and to each other and provided with sharp cutting-edges.

The curved bar A is provided with upwardly-turned ends $a$, which are parallel with each other, and between which is placed the wooden handle B, which is held in place by screws $b$ passing through the ends of the bar A into the ends of the handle. To the said curved bar A are attached the cutters C, which are arranged radially with reference to the center of the curvature of the bar A. The said cutters are preferably made slightly conical to facilitate the discharge of the dough, and their adjoining surfaces are connected by solder, which extends each way a short distance beyond the points of contact to prevent the entrance of the dough between the cutters. The edges of the cutters are preferably sharpened to facilitate the operation of cutting.

In the present case I have shown only a single bar with a single series of four round cutters attached; but I may employ a number of bars, each carrying a series of any number of cutters where it is desirable to cut large quantities of biscuit, and I do not confine my invention to round cutters, but include cutters of all shapes used by bakers for producing fancy cakes and biscuits.

Although I have shown the curved bar A attached to a wooden handle B, I do not limit or confine myself to this construction, as the said bar and handle may be made integral in a single casting. The bar A is preferably tinned to prevent corrosion and to facilitate the attachment of the cutters C by soldering.

The cutter is used by pressing it upon the dough which rests upon the board in the usual way, and giving the cutter a rocking motion, so as to cause its entire under surface to come in contact with the board.

Having thus described my invention, I claim as new and desire to secure by Letters Patent—

As an improved article of manufacture, a biscuit-cutter consisting of the curved bar A, provided with the upwardly-extending arms $a$, the handle B, secured between the said arms, and the conical cutters C, provided with beveled cutting-edges and attached to the curved bar, the angular spaces between the said cutters having a filling of solder, substantially as specified.

HENRY T. SIDWAY.

Witnesses:
ROBT. D. MELICK,
JAMES F. CASSIDY.